May 25, 1965 C. G. LYON 3,184,808
WEATHERSTRIPS
Filed Jan. 15, 1963

INVENTOR
Charles G. Lyon
by
Agent

United States Patent Office 3,184,808
Patented May 25, 1965

3,184,808
WEATHERSTRIPS
Charles G. Lyon, 527 Gertrude Ave.,
Winnipeg, Manitoba, Canada
Filed Jan. 15, 1963, Ser. No. 251,571
1 Claim. (Cl. 20—69)

This invention relates to weatherstripping, of the type commonly used in preventing air leakage past doors and windows, or like closures. Such stripping usually consists of (1) felting or other soft material which is compressed by the closure; (2) angularly positioned material which shape-flexes to the closure when pressed thereby; and (3) a combination of both 1 and 2. The present invention is designed along the lines of the latter combination.

It is known in the weatherstripping art to reinforce one side of a strip of rubber with a retaining cover, such that the opposite side of the rubber projects from the retainer at an angle. In this arrangement the retainer is nailed or otherwise fastened to a closure framework, while the projecting rubber edge receives the closure thereagainst and flexes to conform thereto, in the closing operation. But it has been found that the projecting rubber edge usually extends too far from the framework in order to properly flex for the closure, and accordingly is inclined to be caught by passing objects and damaged. Further, such a long single blade of rubber is relatively weak and therefore hard to maintain in full length closure contact, especially as it deteriorates with age. When damaged or so weakened, such weatherstripping is useless as a draft excluder.

The principal object of the present invention is to provide a simply designed weatherstrip of soft and pliable material for the purpose, which is bent-reinforced for extra strength, the free side protected from contact with passing objects, which can be economically fabricated, and which will present a relatively strong, resilient, undamaged edge to receive the closure.

A further object of the invention is to design said weatherstrip in a compact manner; such that it will not project too far from the closure framework but occupy a minimum of space; and yet permit a maximum of flexing in conformity to the closure, and in the closing operation, for stoppage of draft.

A further object of the invention is to construct the weatherstrip in a simple, one-piece design, embodying both fastening and flexing portions.

A further object of the invention is to design said one-piece weatherstrip for groove-locking of one side thereof into a reinforcing cover, for strong fastening and rigidity of said side.

A further object of the invention is to include means in said one-piece design to prevent leakage of air between said cover and the closure framework.

A still further object of the invention is to design the cover such that it will tend to maintain the shape of the one-piece weatherstrip.

With the above important objects in view, the invention consists essentially in the design, construction and arrangement of the various parts hereinafter more particularly described, reference being had to the accompanying drawings, wherein like characters of reference indicate corresponding parts in the several figures, and wherein.

Figure 5:
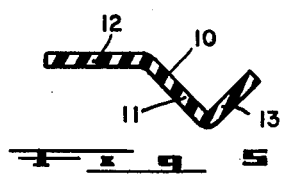
FIGURE 5 is an enlarged profile of the one-piece weatherstrip by itself.

The new one-piece weatherstrip is shown in profile in FIGURE 5 and comprises a zig-zag-shaped strap 10, which is preferably formed or molded from relatively soft sheet material, such as rubber, although it could be produced from other suitable material, such as plastic. The cross section of the strap 10 presents a central flat area 11 therealong, one side 12 is turned at a relatively 45° angle to said area 11, while the opposite side 13 is turned at an approximate right angle to said central area, and in the opposite direction to the first mentioned side 12, and so producing the zig-zag shape.

As the material of this weatherstrip is relatively soft, and therefore easily damaged, a U-shaped reinforcing metal cover fastening 14 is secured over the side 12 of the weatherstrip, from the edge thereof. When this cover is applied, the weatherstrip can be easily secured, as by nails 15 through said cover to the inner face of a closure framework, such as shown at 16. By observing FIGURE 1 it will be seen that the side 12 and the cover 14 are against the framework 16 while the side 13, which is relatively shorter than the side 12, is supported in spaced relation from the framework to resiliently receive a closure thereagainst, such as the door, indicated at 17.

Figure 1:
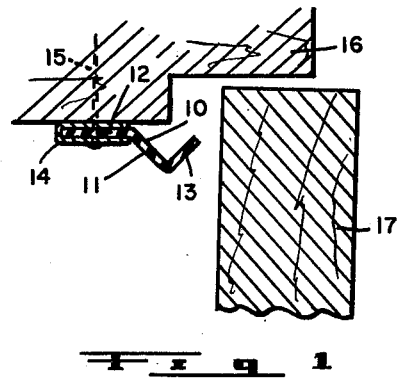
FIGURE 1 is a partial horizontal section through a door (closure) and door framework, showing the door partially open and the new reinforced weatherstrip in position on the framework, ready to receive said door.

As previously mentioned, it is known to provide a weatherstripping somewhat similar to that shown in FIGURE 1, but where the side 13 instead of being turned outward at a right angle is extended as a continuation of the central area 11. Such a construction presents a relatively long resilient blade, the edge of which receives the door closure, with little resiliency. This long blade is also very liable to be struck by passing objects, torn or otherwise mutilated, thus ruining its draft excluding properties.

Figure 2:
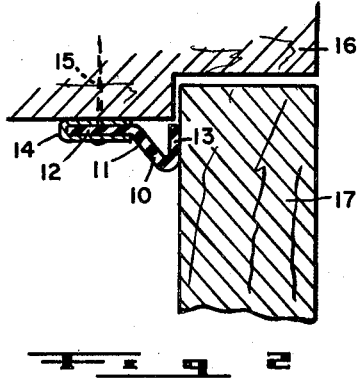
FIGURE 2 is a similar section to FIGURE 1 but showing the door closed in the framework, and against the weatherstrip.

By observing FIGURES 1 and 2 it will be seen that the central area 11 is at an approximate 45° angle to the side 12, and as the side 13 is at right angles to this central area, both these latter parts are at the same, but opposite angle, in relation to the side 12, and both can flex under door pressure to the same amount as the long blade above mentioned. The right angle strongly reinforces these parts for improved resiliency against the door pressure, and therefore provides better draft exclusion. The right angle turn brings the side 13 back toward the framework 16 in a compact construction, with the edge thereof out of the way for passage of objects through the doorway, and accordingly protecting same from damage. As the door closes (see FIGURE 2) the side 13 bends toward an acute angle with the area 11, by the door pressure, and is inclined to flatten against the door for a surface contact therewith. If the door warps outwardly in time, the resiliency of the side 13 will accommodate the fluctuation, and if it warps inward, the area 11 still offers sufficient resiliency to allow for same, thus providing a perfect seal all around the door or closure at all times, when closed.

In attaching such a weatherstrip to a door or other closure framework, the door will first be closed, and the weatherstrip placed thereagainst, on the inside, pretty well in the manner shown in FIGURE 2. The fastening nails will then be driven through the cover, the side 12, and into the framework, to hold the weatherstrip in place. The door can then be operated freely, but all draft will be excluded when it is closed.

Figure 3:
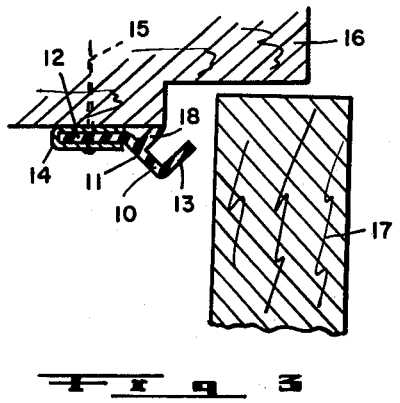
FIGURE 3 is a view similar to FIGURE 1 but showing a modified type of covered weatherstripping on the framework.
Figure 4:
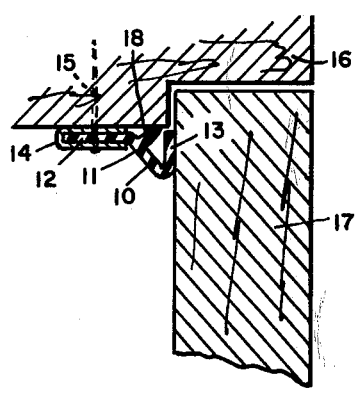
FIGURE 4 is a view similar to FIGURE 2 but showing the weatherstrip of FIGURE 3.

While the weatherstrip construction shown in FIGURES 1 and 2 forms an ideal draft excluder, it sometimes happens that the metallic reinforcing cover does not make a perfectly sealed connection with the framework. In other words, it may spring outwardly therefrom, between the nails. In such cases, draft air may pass around the door edges, get behind the side 13, and then pass through the sprung openings between the nails. The construction shown in FIGURES 3 and 4 is designed to prevent this. In this arrangement, the central section 11 is provided with an extra side tongue 18, which projects in the same general direction as the side 13, but is spaced therefrom and is of shorter length, giving an F-shaped profile to the weatherstrip. Accordingly, when this weatherstrip is applied in the same manner as above explained, this short tongue contacts the framework, just ahead of the cover, and flexibly bends thereagainst as shown, insuring that no draft will even reach the cover. As this weatherstrip is attached with the door closed, as shown in FIGURE 4, the tongues and side 13 are under resilient strain. Accordingly, when the door is opened, the tongue 13 opens out as shown in FIGURE 3, while the resiliency at the obtuse angle maintains the pressure of the tongue 18 against the framework.

Figure 6:
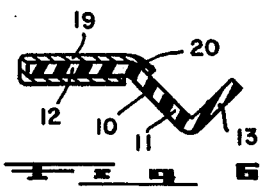
FIGURE 6 is a view similar to FIGURE 1 but showing a bent extension on the reinforcing cover for retaining the one-piece shape of the weatherstrip.

The cover 19, shown in FIGURE 6, is a valuable improvement over that shown at 14 in the first four figures. In this arrangement, a short extension 20 is added to the framework-contacting face of the original cover 14. This extension is curve-bent inwardly of the doorway, at an approximate 45° angle to the main portion thereof, to follow along behind the 45° angle bend of the weatherstrip, and so assist in maintaining the shape of the weatherstrip, while at the same time it reinforces the central area 11. It is also a big help in maintaining a straight weatherstrip when being carried by a workman on the job. While I have mentioned that the one-piece weatherstrip of FIGURE 5 is formed or molded in a zig-zag shape, it could be formed flat, with just the right-angled bend to provide the side 13. If the remaining straight portion (11 and 12) is then fitted to cover 19, and suitably secured thereto, the bent extension 20 thereof will automatically produce the 45° angle in the weatherstrip, between the central area 11 and side 12, and hold them at such an angle, insuring the zig-zag shape of the weatherstrip.

Figure 7:
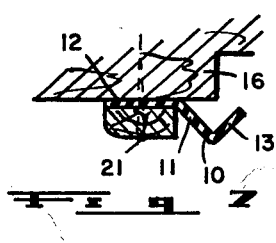
FIGURE 7 shows the one-piece weatherstrip of FIGURE 5 secured directly to a framework by a wooden batten.
Figure 8:
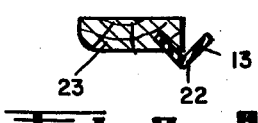
FIGURE 8 shows a modified construction of the pliable weatherstrip, used in a wooden backing.

In the drawings, I have shown the two covers 14 and 19 made from metal, as a protection for the soft material of the weatherstrip, and as a solid backing for nailing. It will be appreciated however, that the zig-zag rubber strap shown in FIGURE 5 could be secured directly to the framework if desired, and held thereto and be protected, by a wooden batten such as shown at 21 in FIGURE 7. Such an arrangement would work equally as efficiently as with the metal covers. Or, as a further modification, an angle-shaped rubber strip 22 could have one side groove-secured in a wooden backing 23, which completes the zig-zag as shown in FIGURE 8, and the said backing can be secured to the framework 16 in the same manner as for the batten 21. Further, if desired, the improved reinforcing cover 19 could be used with the construction shown in FIGURES 3 and 4.

What I claim as my invention is:

A weatherstrip for the doorway of a building, comprising: a resilient thin strap of even thickness; one side of said strap turned at an obtuse angle and the opposite side thereof turned at an approximate right angle and in the opposite direction to said first mentioned side, to leave a central flat area therebetween therealong and form a zig-zag shape to said strap in cross section; an integral side tongue of thin even thickness projecting from the central part of said resilient strap therealong, in parallel relationship with said right angled side, and spaced therefrom; and a flattened U-shaped cover telescoped over said obtuse angled side, for contact with a door framework, and passage of fastening means therethrough.

References Cited by the Examiner

UNITED STATES PATENTS

| 1,592,466 | 7/26 | Morgan | 20—69 |
| 1,641,157 | 9/27 | Cook | 20—69 |
| 2,498,852 | 2/50 | Doty | 20—69 |
| 2,528,264 | 10/50 | Coppock et al. | 20—69 |
| 2,724,876 | 11/55 | Chagnon | 20—69 |
| 2,734,238 | 2/56 | Clapp | 20—69 |
| 2,793,070 | 5/57 | Wernig | 20—69 |

FOREIGN PATENTS

| 506,004 | 10/51 | Belgium. |
| 1,144,521 | 10/57 | France. |
| 827,860 | 5/52 | Germany. |
| 1,087,792 | 12/54 | Germany. |

HARRISON R. MOSELEY, *Primary Examiner.*